United States Patent
Long et al.

[11] Patent Number: 6,062,172
[45] Date of Patent: May 16, 2000

[54] ANIMAL HEAD SUPPORT DEVICE AND METHOD OF USE

[76] Inventors: Raymond D. Long, 715 Greenbae Dr., Sparks, Nev. 89431; Scott Greene, P.O. Box 5780, Sparks, Nev. 89432

[21] Appl. No.: 09/144,530

[22] Filed: Aug. 31, 1998

Related U.S. Application Data

[60] Division of application No. 08/768,234, Dec. 17, 1995, Pat. No. 5,799,617, which is a continuation-in-part of application No. 08/534,715, Sep. 27, 1995, abandoned.

[51] Int. Cl.[7] .................................................. A01K 15/04
[52] U.S. Cl. .............................................................. 119/712
[58] Field of Search .................................... 119/712, 725, 119/728, 726, 729, 749, 752, 755, 766, 767, 768; 452/54

[56] References Cited

U.S. PATENT DOCUMENTS

| | | | |
|---|---|---|---|
| 645,664 | 3/1900 | Hart | 119/755 |
| 678,117 | 7/1901 | Kock | 119/755 |
| 1,275,277 | 8/1918 | Linfoot | 119/755 |
| 1,603,222 | 10/1926 | Transue | 119/755 |
| 2,942,575 | 6/1960 | Boyd et al. | 119/755 |
| 3,244,149 | 4/1966 | Bosko et al. | 119/755 |
| 3,528,215 | 9/1970 | Johnson | 119/831 |
| 5,799,617 | 9/1998 | Long et al. | 119/712 |

*Primary Examiner*—Thomas Price
*Attorney, Agent, or Firm*—Ian F. Burns

[57] ABSTRACT

The present invention comprises substantially an animal head support device and method of use to adjustably and comfortably support the head of an anaesthetized animal during medical treatment or other procedures. The device includes a ring for receiving the head of an animal there through, a support means, such as a rope, for supporting the ring from an overhead structure, and a padded chin rest. The device may further include a cam cleat that allows for variable height adjustment. An alternative embodiment is disclosed which provides a ground mounted support device in which a flexible stand supports a U-shaped ring that in turn supports the head of the animal.

18 Claims, 4 Drawing Sheets

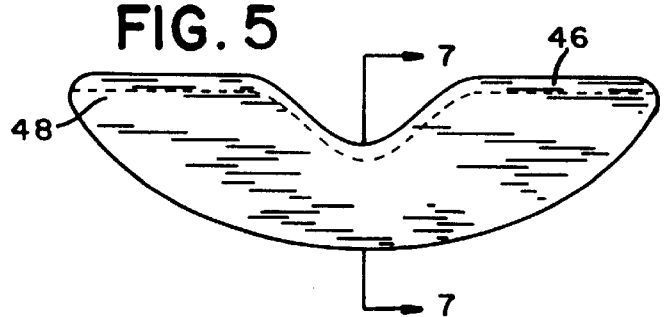
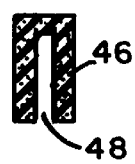
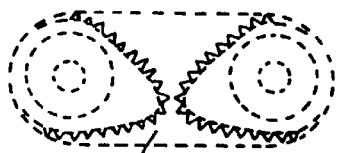
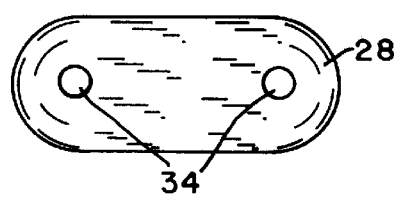
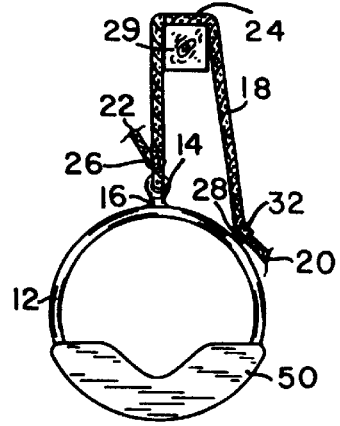

ANIMAL HEAD SUPPORT DEVICE AND METHOD OF USE

CROSS REFERENCES TO RELATED APPLICATION

This patent application is a divisional application of application Ser. No. 08/768,234 filed on Dec. 17, 1995 now U.S. Pat. No. 5,799,617 which was a continuation-in-part of application Ser. No. 08/534,715 filed on Sep. 27, 1995, the latter now abandoned.

BACKGROUND OF THE INVENTION

1. Field of Invention

The present invention relates to head support devices that may be used to support the head of an anaesthetized animal, such as a horse.

2. Description of Related Art

It is a common practice in the field of veterinary medicine to sedate animals when performing some procedures. For example, horses are routinely sedated when dental procedures are performed, such as floating (filing) a horse's teeth. Sedation keeps the animal calm during the procedure, allows the practitioner to more quickly and easily perform the procedure, and prevents injury to the animal and the practitioner. In fact, some procedures would be impossible to perform without sedating the animal.

One of the problems associated with sedating animals is that sedated animals tend to drop their heads towards the ground. This is not only uncomfortable for the animal, but significantly interferes with many veterinary procedures involving the animal's head. It is often necessary for the practitioner to employ an assistant to physically hold the animal's head up. It can be costly for the practitioner to employ an assistant to do this and an assistant is not always available. Therefore, a need exists for a portable device which humanely, safely, and comfortably supports the head of a sedated animal.

In the past, many devices to restrain animals have been developed, such as U.S. Pat. Nos. 5,329,882, 4,549,501 and 266,016. However, each of these devices are intended to immobilize the animal and not intended to support the animal's head. It has been found that many animals, such as horses, become spooked when their heads are restrained and they can injure themselves and the practitioner by trying to escape. Therefore, it is contended that during medical treatment, a sedated animal's head should be supported and not restrained, so as to reduce the risk of injury and alleviate stress that may be experienced by the animal.

SUMMARY OF INVENTION

1. Objects of the Invention

It is therefore an object of the present invention to provide an animal head support device that may be used by veterinarians, or the like, for comfortably supporting the head of an anesthetized animal during medical treatment.

A further object of the present invention is to provide an animal head support device that is portable.

Another object of the present invention is to provide an animal head support device that may be manufactured in a variety of sizes so as to allow the device to be used with various sized animals.

Still another object of the present invention is to provide an animal head support device that allows the user to perform medical procedures upon an animal while remaining in a normal standing position.

Also, another object of the present invention is to provide an animal head support device which allows the user to easily maneuver the animal's head into various positions and directions, such as latterly and longitudinally.

Yet another object of the present invention is to provide an animal head support device which is vertically adjustable.

Still another object of the present invention is to provide an animal head support device that is removably attachable to an overhead support structure, such as a beam, barn rafter, or a support pole as found on a typical cattle stock.

A further object of the present invention is to provide an animal head support device that utilizes a cam cleat to adjust the height of the device.

Yet another important object of the present invention is to provide an animal head support device which includes a cross bar shaped to comfortably support the chin of an animal when positioned thereupon.

Still another object of the present invention is to provide an animal head support device that includes a resilient cushion that also provides padding for the cross bar.

A further object of the present invention is to provide an animal head support device that includes a removable protective cover for protecting the cushion described above.

Another object of the present invention is to provide an animal head support device that is safe and easy to use.

Yet another object of the present invention is to provide an animal head support device which does not restrain the animal but simply provides comfortable head support.

Still another object of the present invention is to provide an animal head support device that may be made from a variety of suitable materials, such as wood, nylon, plastic, hard rubber, and metal.

A further object of the present invention is to provide an animal head support device that is easy and economical to manufacture.

Yet another object of the present invention is to provide an animal head support device which places the animal's head at a position of choice, which allows the user to easily perform numerous medical procedures in an unobstructed manner.

A further object of the present invention is to provide an animal head support device that supports the head of an animal from the ground.

Still another object of the present invention is to provide an animal head support device that supports the head of an animal from the ground and is flexible enough to allow the animal to move its head laterally and longitudinally.

A further object of the present invention is to provide a ground standing head support device that does not completely enclose the animal's head.

Still another object of the present invention is to provide a method of use for an animal head support device.

Other objects and advantages will be seen within the following specification and claims.

2. Brief Description of the Invention

The present invention is substantially an animal head support device used by veterinarians or the like, for supporting the head of an anesthetized animal during medical treatment. The device substantially includes a ring being of a size and shape to freely receive the head of an animal there through. Support means, such as a rope, which may be attached to the ring for supporting the ring. A cushioned chin rest is also provided for supporting the chin of the animal. The support means may be removably attached to an overhead support structure, such as a beam, or if preferred, the rope may be draped over the support structure and adjustably secured at a desired height by a cam cleat. A second, smaller ring may be attached to the first ring for receiving the support means.

BRIEF DESCRIPTION OF THE DRAWINGS

FIG. 5 is substantially a frontal view of a resilient cushion of the present invention.

FIG. 6 is substantially a bottom view of the cushion shown in FIG. 5.

FIG. 7 is substantially a sectional view of the cushion taken at line 7—7 of FIG. 5.

FIG. 8 is substantially a bottom view of a protective cushion cover of the present invention.

FIG. 9 is substantially a cam cleat shown in ghost lines.

FIG. 10 is substantially a frontal view of a bracket.

FIG. 11 is substantially a plan view of the present invention supported by an overhead beam.

Figure 1:
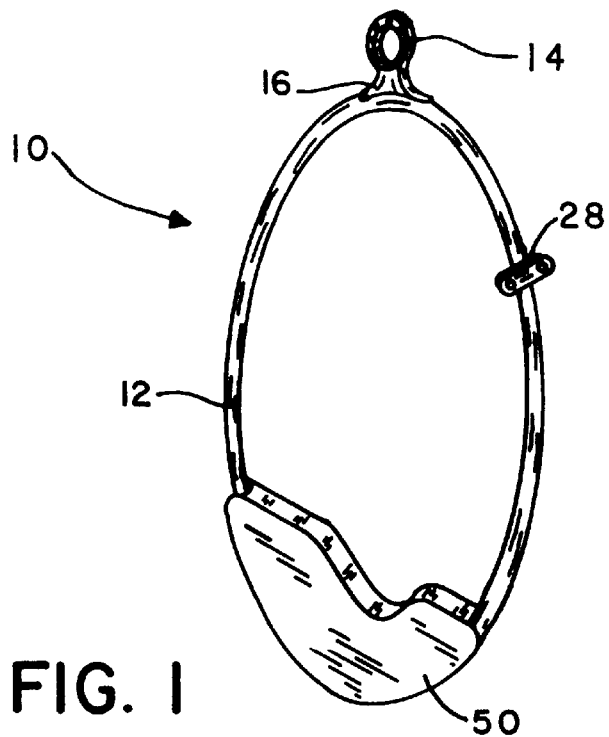
FIG. 1 is substantially a perspective view of the present invention.
Figure 2:
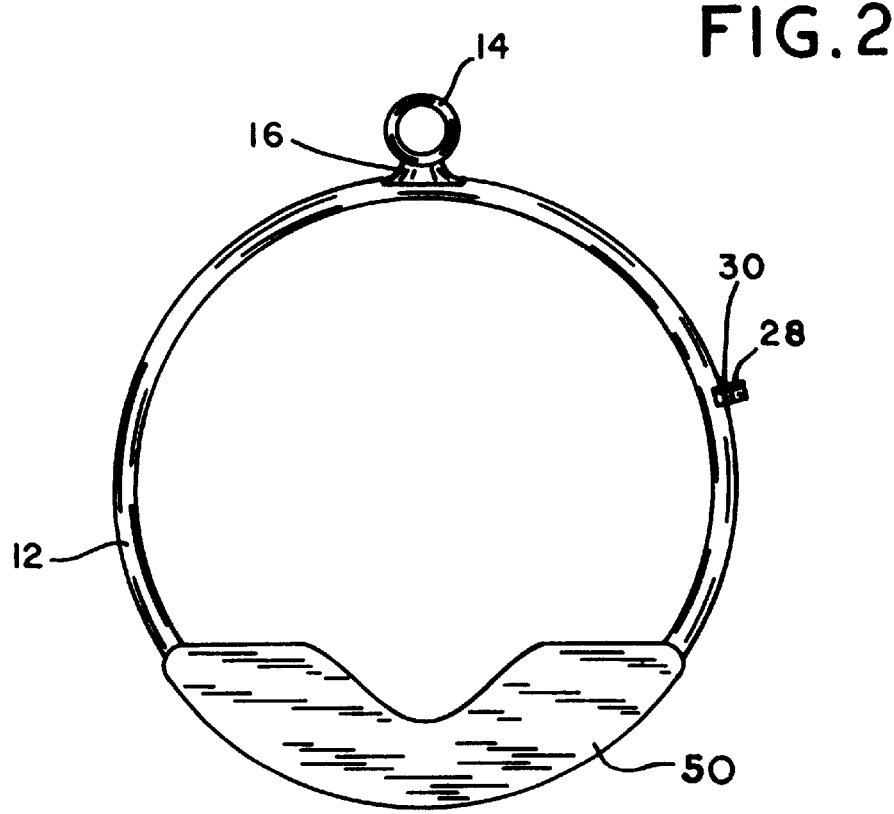
FIG. 2 is substantially a frontal view of the present invention.
Figure 3:
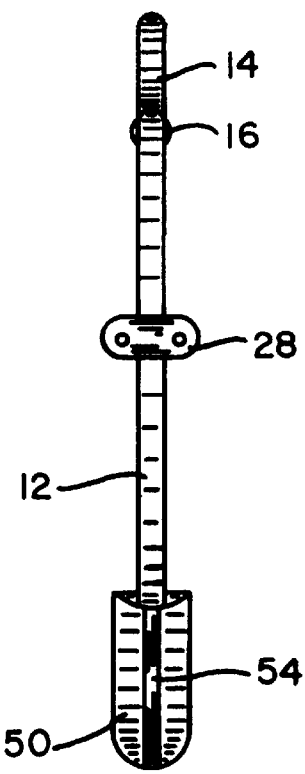
FIG. 3 is substantially a right side view of the present invention.
Figure 4:
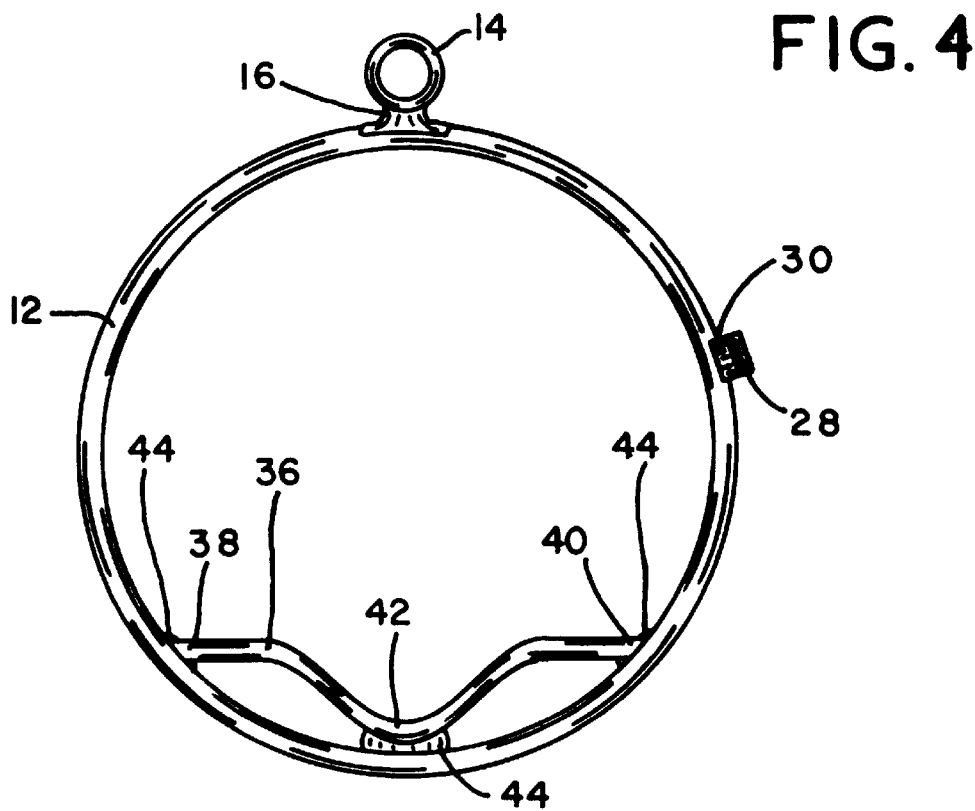
FIG. 4 is substantially a frontal view of the present invention without a cushion of the present invention.

REFERENCE NUMERALS 10 head support device
12 first ring
14 second ring
16 weld
18 rope
20 first end
22 second end
24 integral connection portion
26 knot
27 beam
28 bracket
29 beam
30 welding
32 cam cleat
34 screw holes
36 cross bar
38 first end
40 second end
42 central section
44 welding
46 cushion
48 recess
50 protective cover
52 tab
54 overlying flap
56 overlying flap
60 ground mounted head support device
62 ring
63 ball
64 cushion
65 cross bar
66 bracket at cover
67 cover
68 bracket
70 adjustable support shaft
72 support sleeve
74 holes
76 locking pin
78 flexible support means
79 spring
80 shaft
82 sleeve
84 support legs
86 stand

DESCRIPTION OF THE PREFERRED EMBODIMENT

Referring now in detail to the drawings wherein like characters refer to like elements throughout the various views.

As shown in FIGS. 1–4, and 11, an animal head support device 10 comprises ring 12, being of a size and shape to freely receive the head of an animal there through and is provided for supporting an animal's head. The ring 12 may be made from any suitable material of choice, such as nylon, plastics, rubber, wood, and metal, which is strong enough to support the weight of sedated animal's head. A second ring 14, being of a size and shape to removably receive a support means (later described) there through, is attached to ring 12. Ring 14 may be made from any suitable material of choice, such as those mentioned above. Second ring 14 is attached to ring 12 (at a location of engineering choice) by any suitable attachment means of choice, such as by weld 16. In an alternative embodiment, ring 14 may not be provided and the support means may be attached directly to ring 12.

Ring 14 may be supported by any suitable support means of choice, such as a rope 18 or a chain (not shown), which has a first end 20, a second end 22, and substantially an integral connecting portion 24, as shown in FIG. 11. Ring 14 is a size and shape to removably and slidably receive second end 22 of rope 18 there through and may be attached by a knot 26 or any other suitable attachment method. Rope 18 may be attached to any suitable support structure of choice, such as a support pole as found on a typical cattle stock, a stable or barn rafter, or as herein shown, a beam 29.

The first ring 12 may further include vertical adjustment means, such as a bracket 28 which is fixedly attached to the first ring 12 (at a location of engineering choice) by weld 30 or other attachment means of choice. Bracket 28 being of a size and shape to removably attach any suitable rope lock means of choice, such as cam cleat 32 which is manufactured by Ronstan 2000 Pty., Ltd., of Australia, shown in FIG. 9. The cam cleat 32 may be removably attached to the bracket 28 by a suitable attachment means of choice, such as by screws (not shown) through screw holes 34, as shown in FIG. 10. Furthermore, cam cleat 32 is a shape and size capable of removably and adjustably receiving the first end 20 of rope 18.

The device 10 further includes a cushioned chin rest that may be of any suitable shape or size of engineering choice. The chin rest comprises a cross bar 36 (shown in FIG. 4) which has substantially a first end 38, a second end 40, and a central section 42. First and second ends 38 and 40 (and the central section 42 if so desired) are fixedly attached to ring 12 by a suitable attachment means, such as by weld 44. Central section 42 may be of a shape and size to comfortably support the chin of an animal when positioned thereupon. Central section 42 may be contoured to fit the head of the animal with which it is intended to be used. Further included is a cushion 46 that may be formed into any suitable shape or size to functionally support the chin of an animal, as shown in FIGS. 5, 6, and 7. Cushion 46 may be made from any suitable material of choice, such as foam rubber. Cushion 46 further includes removable attachment means of choice such as recess 48 for removably attaching and receiving the cross bar 36 therein.

A protective cover 50 may be used to protect cushion 46. Cover 50 may be made of any suitable material of choice, such as plastic, nylon, or cloth, and cover 50 may be of a shape and size to contain cushion 46 therein. Protective cover 50 may also be removably attached to cushion 46, if so desired, by any suitable attachment and/or closure means of choice. As seen in FIG. 8, a VELCRO tab 52 may be provided which releasably connects two overlying flaps 54 and 56.

The present invention comprises a method for using the animal head support device described above. The following is a summary of the steps that comprise the method of the present invention in reference to FIG. 11 and the above description.

a) attaching second end 22 of rope 18 to second ring 14 by tying a knot 26;
b) positioning the integral connecting portion 24 over the support structure 29;
c) positioning the first end 20 of rope 18 within the cam cleat 32;
d) pulling the first end 20 of rope 18 through the cam cleat 32 until the first ring 12 attains a desired height, determined by the user;
e) inserting an animal's head into ring 12; and
f) readjusting the height of support device, if necessary, to support the head of the animal.

It will now be seen that an animal head support device is provided which may be used by veterinarians, or the like, for comfortably supporting the head of an anesthetized animal during medical treatment or other procedures. The animal head support device is portable, vertically adjustable and removably attachable to an overhead support structure. The support device includes a cross bar, a removable cushion, and a cover for protecting the cushion. It will further be seen that the animal head support device is easy to manufacture, safe, and easy to use.

Figure 12:
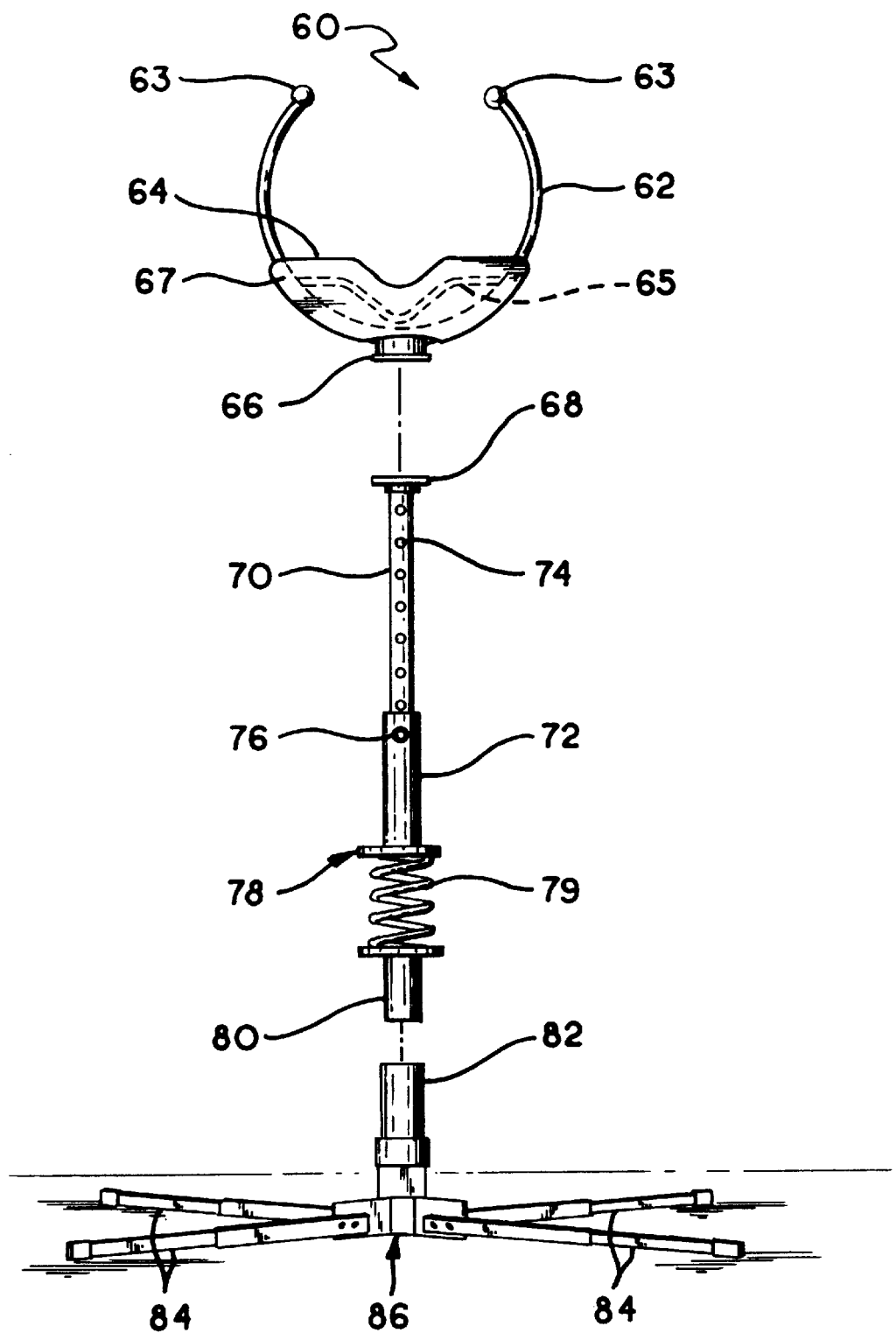
FIG. 12 is substantially an exploded view of a ground-supported embodiment of the present invention.

As seen in FIG. 12, the present invention includes an alternative embodiment in which the sedated animal's head is supported from the ground. This ground mounted head support device 60 includes U-shaped ring 62 for receiving the sedated animal's head. In the preferred embodiment, ring 62 has an open portion at the top of the ring. It has been found that some animals, particularly horses, do not like to have their head surrounded by an object. By providing an open portion at the top of ring 62, horses will experience less anxiety and not become spooked during a procedure. Balls 63 may be provided at the upper end of ring 62 to prevent any injury to a sedated animal from sharp edges. Ring 62 may have a cushion 64 for cushioning the sedated animal's head and a cover 67 for protecting cushion 64. Cushion 64 may have substantially the same features and construction as cushion 46 of head support device 10, discussed above. Ring 62 may also include a cross bar 65 for supporting cushion 64. An attachment means or bracket 66 may be attached to ring 62 for allowing an adjustable support shaft 70 to be attached to ring 62. Support shaft 70 may also include bracket 68 for interfacing with bracket 66. Support shaft 70 comprises a plurality of holes 74 for receiving locking means or locking pin 76. Support shaft 70 is slidably received in support sleeve 72 and may be locked into a variety of heights by locking pin 76. Spring means 78 is attached to support sleeve 72 for flexibly supporting the elements discussed above. Flexible support 78 may include spring 79 or other flexible devices that would allow the entire support device to be flexed laterally and longitudinally relative to the body of the horse. Flexible support 78 is well known in the art of signs.

It has been found that a flexible support device is highly desirable in many animal treatments. Such devices allow the animal to move its head to some degree without knocking over the head support device. Flexible support means 78 is attached to stand 78 though shaft 80 and sleeve 82. Shaft 80 may be inserted into sleeve 82 and the two may be securely bolted together. Support legs 84 are provided on stand 86 for supporting the entire apparatus from the ground. It is recognized that a variety of support stands may be used to achieve the objectives of the present invention.

It will now be seen that an animal head support device is provided which may be used by veterinarians or the like for comfortably supporting the head of an anesthetized animal during medical treatment or other procedures from the ground. The animal head support device may be placed on the ground to adjustably and flexibly support the head of the anesthetized animal. The support device includes a U-shaped ring for receiving and supporting the head of the animal, an adjustable support shaft, and a flexible support means for flexibly supporting the support shaft and ring. A stand is provided for supporting the apparatus from the ground.

Although the invention has been shown and described in what is conceived to be the most practical and preferred embodiment, it is recognized that departures may be made therefrom within the scope and spirit of the invention and that the invention is not limited to the details disclosed herein but is to be accorded the full scope of the claims so as to embrace any and all equivalent devices and apparatus.

What is claimed is:

1. An animal head support device, comprising:
   (1) a ring adapted to receive and support an animal's head;
   (2) a support means, said support means be adapted to be attached to said ring and support said ring from a support structure; and
   (3) a cross bar attached to said ring, said cross bar being adapted to support the animal's head within said ring, wherein a sedated animal's head may be supported and vertically positioned.

2. The animal head support device of claim 1 wherein said support means is a rope, said rope being adapted to be tied to said ring.

3. The animal head support device of claim 2 further comprising a cam cleat attached to said ring, said cam cleat being adapted to adjustably secure said rope to said ring, whereby the vertical position of said head support may be adjusted by positioning said rope in said cam cleat.

4. The animal head support device of claim 1 further comprising a cushion attached to said ring, said cushion being adapted to cushion the animal's head when the animal's head is supported by said ring.

5. The animal head support device of claim 4 further comprising a cover substantially enclosing said cushion, said cover being adapted to protect said cushion.

6. The animal head support device of claim 1 wherein said cross bar is substantially shaped to match the contours of the animal's head.

7. The animal head support device of claim 1 further comprising a second ring, said second ring being adapted to attach said support means to said ring.

8. A method of supporting an animal's head using an animal head support device, the animal head support device comprising a ring and a support means, the method comprising the following steps:

(1) attaching the support means to a support structure, the support structure being positioned substantially above the animal's head;

(2) attaching the support means to the ring wherein the ring hangs from the support structure by the support means; and (3) inserting the animal's head into the ring.

9. The method of claim 8 wherein the support means comprises a rope and said support device further comprises a cam cleat, the method further comprising the step of attaching the rope to the support device with the cam cleat.

10. The method of claim 9 further comprising the step of adjusting the position of the support means in the cam cleat.

11. The method of claim 8 further comprising the step of inserting the animal's head into the ring.

12. The method of claim 8 further comprising the step of sedating the animal.

13. A hanging animal head support device, comprising:

(1) a substantially ring-shaped structure with a vacant center, the structure being adapted to receive an animal's head;

(2) a support means attached to said structure, said support means being adapted to support said ring-shaped structure from a support structure; and (3) a cross bar attached to said ring-shaped structure, said cross bar being adapted to support the animal's head within said ring.

14. The support device of claim 13 wherein said support means is a rope, said rope being adapted to be tied to said structure.

15. The support device of claim 14 further comprising a cam cleat attached to said structure, said cam cleat being adapted to adjustably secure said rope to said ring.

16. The support device of claim 13 further comprising a second ring attached to said structure, said second ring being adapted to attach said support means to said structure.

17. The support device of claim 13 further comprising a cushion attached to said structure, said cushion being adapted to cushion the animal's head when the animal's head is supported by the support device.

18. The support device of claim 17 further comprising a cover, said cover being adapted to substantially cover at least a portion of said cushion.

* * * * *